(12) United States Patent
Denham

(10) Patent No.: US 11,380,468 B2
(45) Date of Patent: Jul. 5, 2022

(54) ELECTRO-PERMANENT MAGNET MOORING SYSTEM

(71) Applicant: The Aerospace Corporation, El Segundo, CA (US)

(72) Inventor: Donald Wayne Denham, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 407 days.

(21) Appl. No.: 16/533,651

(22) Filed: Aug. 6, 2019

(65) Prior Publication Data

US 2019/0385772 A1 Dec. 19, 2019

Related U.S. Application Data

(63) Continuation-in-part of application No. 16/011,643, filed on Jun. 19, 2018.

(51) Int. Cl.
*H01F 7/02* (2006.01)
*B63B 21/02* (2006.01)
*B64G 1/10* (2006.01)

(52) U.S. Cl.
CPC ............ *H01F 7/0273* (2013.01); *B63B 21/02* (2013.01); *H01F 7/0205* (2013.01); *B64G 1/10* (2013.01)

(58) Field of Classification Search
CPC ....... H01F 7/0273; H01F 7/0205–0257; B63B 21/02
USPC ........................................................ 335/229
See application file for complete search history.

(56) References Cited

U.S. PATENT DOCUMENTS

| | | | |
|---|---|---|---|
| 3,428,867 A * | 2/1969 | Becker | H01F 13/003 361/148 |
| 3,544,041 A | 12/1970 | Billerbeck et al. | |
| 3,978,441 A * | 8/1976 | Sobottka | B23Q 3/1546 335/284 |
| 4,264,887 A * | 4/1981 | Barrett | H01F 7/206 335/289 |
| 4,381,092 A | 4/1983 | Barker | |
| 4,480,014 A | 10/1984 | Milligan et al. | |
| 4,523,083 A | 6/1985 | Hamilton | |
| 4,700,475 A | 10/1987 | Jost et al. | |
| 5,096,279 A | 3/1992 | Hornbeck et al. | |
| 5,270,678 A * | 12/1993 | Gambut | B23Q 3/1546 269/8 |
| 5,410,924 A | 5/1995 | Krasnov | |
| 5,904,096 A | 5/1999 | Fawcett et al. | |

(Continued)

OTHER PUBLICATIONS

Alexander Talpalatski, "Final Office Action", dated Jun. 30, 2021, U.S. Appl. No. 16/011,643.

(Continued)

*Primary Examiner* — Alexander Talpalatski
(74) *Attorney, Agent, or Firm* — LeonardPatel PC

(57) ABSTRACT

An electro-permanent magnet (EPM) for an electromagnetic mooring system (EMS) includes a low coercivity magnet surrounded by a reversible coil, and one or more high coercivity magnets surrounding the low coercivity magnet and the reversible coil. The reversible coil switches polarity of the low coercivity magnet to null the stronger, one or more high coercivity magnets. The nulling of the stronger, one or more high coercivity magnets allows for the EMS to connect and disconnect to an adjacent apparatus.

17 Claims, 3 Drawing Sheets

(56) References Cited

U.S. PATENT DOCUMENTS

| | | | | |
|---|---|---|---|---|
| 6,104,270 | A * | 8/2000 | Elias | B66C 1/04 |
| | | | | 335/289 |
| 6,288,623 | B1 * | 9/2001 | Janzen | B66C 1/04 |
| | | | | 335/289 |
| 7,151,428 | B2 | 12/2006 | Flood | |
| 7,453,341 | B1 * | 11/2008 | Hildenbrand | H02K 26/00 |
| | | | | 310/154.01 |
| 8,031,038 | B2 | 10/2011 | Kimura | |
| 9,220,365 | B1 | 12/2015 | Okonkwo | |
| 9,231,323 | B1 | 1/2016 | Jaeger | |
| 9,589,715 | B2 * | 3/2017 | Choi | H01F 7/0257 |
| 10,236,107 | B2 * | 3/2019 | Choi | H01F 7/066 |
| 10,460,864 | B2 | 10/2019 | Choi | |
| 2006/0016935 | A1 | 1/2006 | Jordan et al. | |
| 2008/0257655 | A1 * | 10/2008 | Ito | B66B 1/3476 |
| | | | | 187/406 |
| 2010/0112194 | A1 | 5/2010 | Inoue et al. | |
| 2014/0227023 | A1 | 8/2014 | Sone et al. | |
| 2016/0284497 | A1 | 9/2016 | Stryker | |

OTHER PUBLICATIONS

Alexander Talpalatski, "Non-Final Office Action", dated Mar. 16, 2021, U.S. Appl. No. 16/011,643.

Alexander Talpalatski, "Non-Final Office Action", dated Jul. 15, 2020, U.S. Appl. No. 16/011,643.

Alexander Talpalatski, "Restriction Requirement", dated Apr. 20, 2020, U.S. Appl. No. 16/011,643.

Debra Werner, "Aerospace Corp.'s iLab Encourages Out-of-the-Box Thinking Without Leaving Home", Space News, Mar. 7, 2018.

Alexander Talpalatski, "Examiner's Answer", dated Jan. 18, 2022, U.S. Appl. No. 16/011,643.

* cited by examiner

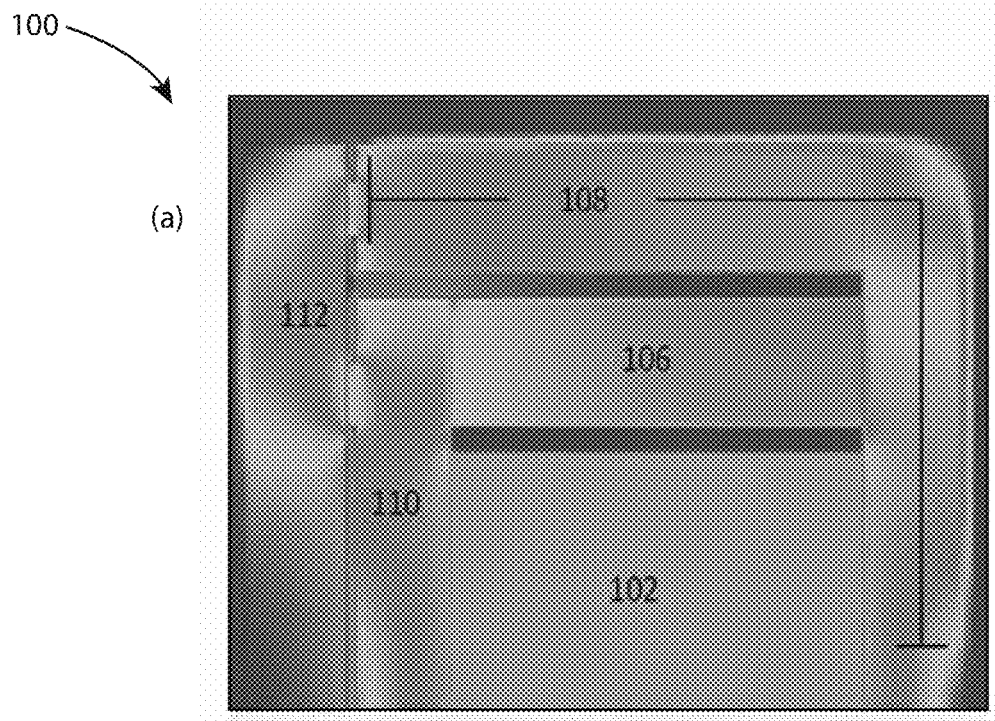
Fig. 3
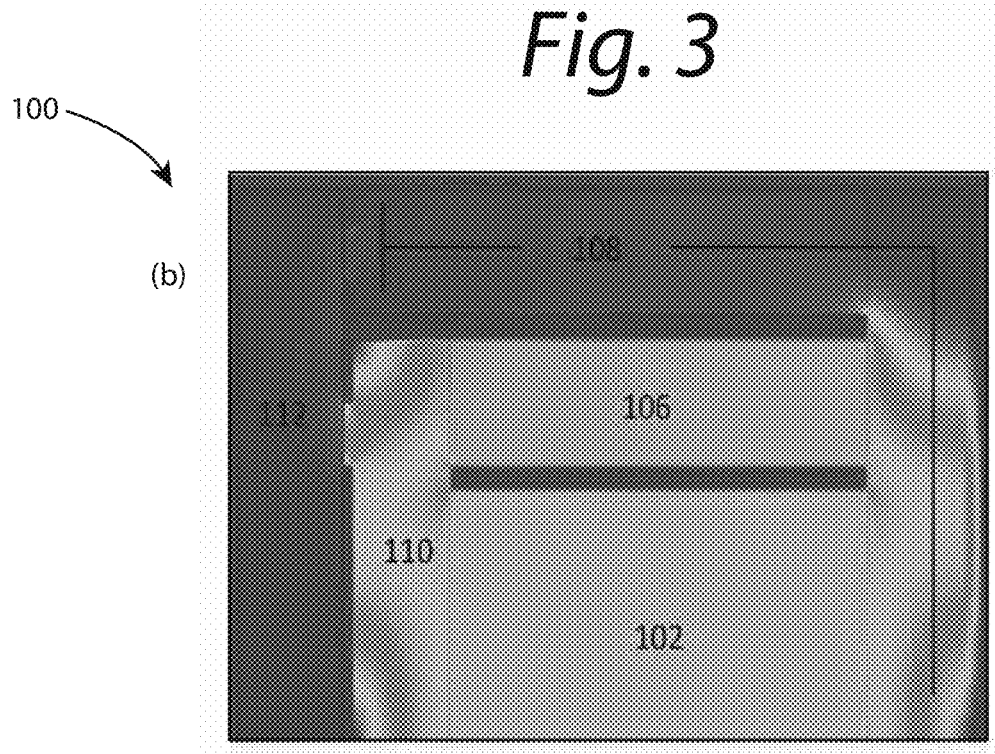

ELECTRO-PERMANENT MAGNET MOORING SYSTEM

CROSS-REFERENCE TO RELATED APPLICATION

This application is a continuation-in-part (CIP) of, and claims the benefit of, U.S. application Ser. No. 16/011,643, filed on Jun. 19, 2018. The subject matter thereof is hereby incorporated herein by reference in its entirety.

FIELD

The present invention relates to electro-permanent magnets (EPMs), and more particularly, to EPMs that electrically switch on and off and/or have their polarity reversed.

BACKGROUND

During payload release, current design architectures are limited to a standard set of possible solutions. These solutions use a similar concept of a frangible mechanical structural member. These devices are usually of a one-shot design nature where the structural member is broken with the application of some form of high energy device. Examples of these are explosive bolts, separation nuts, Frangibolt releases, pin pullers, shape memory alloy releases, linear shape charges, frangible joint, burn wire, and split spool devices.

These conventional energetic payload release mechanisms cause various problems throughout the product life cycle. For example, some problems include storage of energetics, safe handling, shelf life, tipoff errors, mechanical shock, unintended acceleration, debris, acceptance testing, and TLYF. In one example, the use of exploding bolts causes random tipoff errors to reentry vehicles that adversely affects accuracy. In another example, frangible devices are used to secure payloads, apparatuses, doors, or other devices in place during launch, early mission phases, and finally payload release. Furthermore, frangible devices are capable of holding large loads, have high reliability, and are electrically simple to integrate.

However, frangible devices come with several drawbacks. These devices release pyrotechnic energy very rapidly causing a large shock load to be generated in the spacecraft. The recovery of the strain energy in the mechanical fastener is an additional source of shock loading. Because of the energetic nature of the release process, unintended acceleration of the payload can be induced. Additionally, because of the conservative nature of space industry, devices that are oversized or designed for other applications are used because they have flight heritage. This approach can lead to over designed release mechanisms with the associated shock loads where a much smaller device could be used.

Thus, alternative EPMs may be more beneficial.

SUMMARY

Certain embodiments of the present invention may provide solutions to the problems and needs in the art that have not yet been fully identified, appreciated, or solved by current frangible mechanical structural members. For example, some embodiments generally pertain to EMPs that are electrically switched off and on and/or have their poles reversed.

In an embodiment, an EPM for an electromagnetic mooring system (EMS) includes a low coercivity magnet surrounded by a reversible coil, and one or more high coercivity magnets surrounding the low coercivity magnet and the reversible coil. The reversible coil switches polarity of the low coercivity magnet to null the stronger, one or more high coercivity magnets. The nulling of the stronger, one or more high coercivity magnets allows for the EMS to connect and disconnect to an adjacent apparatus.

In another embodiment, an apparatus for the EMS includes a reversible coil surrounding a low coercivity magnet, and is configured to switch polarity of the low coercivity magnet to null a stronger, one or more high coercivity magnets. The switching of the polarity allows for the EMS to connect and disconnect with an adjacent vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 are images illustrating the "On" and "Off" magnetic flux path of an EPM, according to an embodiment of the present invention.

DETAILED DESCRIPTION OF THE EMBODIMENTS

Embodiments of the present invention generally pertain to an EPM. In some embodiments, the EPM includes a low coercivity magnet surrounded by a reversible coil, and one or more high coercivity magnets surrounding the low coercivity magnet and the reversible coil. The reversible coil switches polarity of the low coercivity magnet to null the stronger, one or more high coercivity magnets. The nulling of the stronger, one or more high coercivity magnets allows for the EMS to connect and disconnect to an adjacent apparatus.

Figure 1:
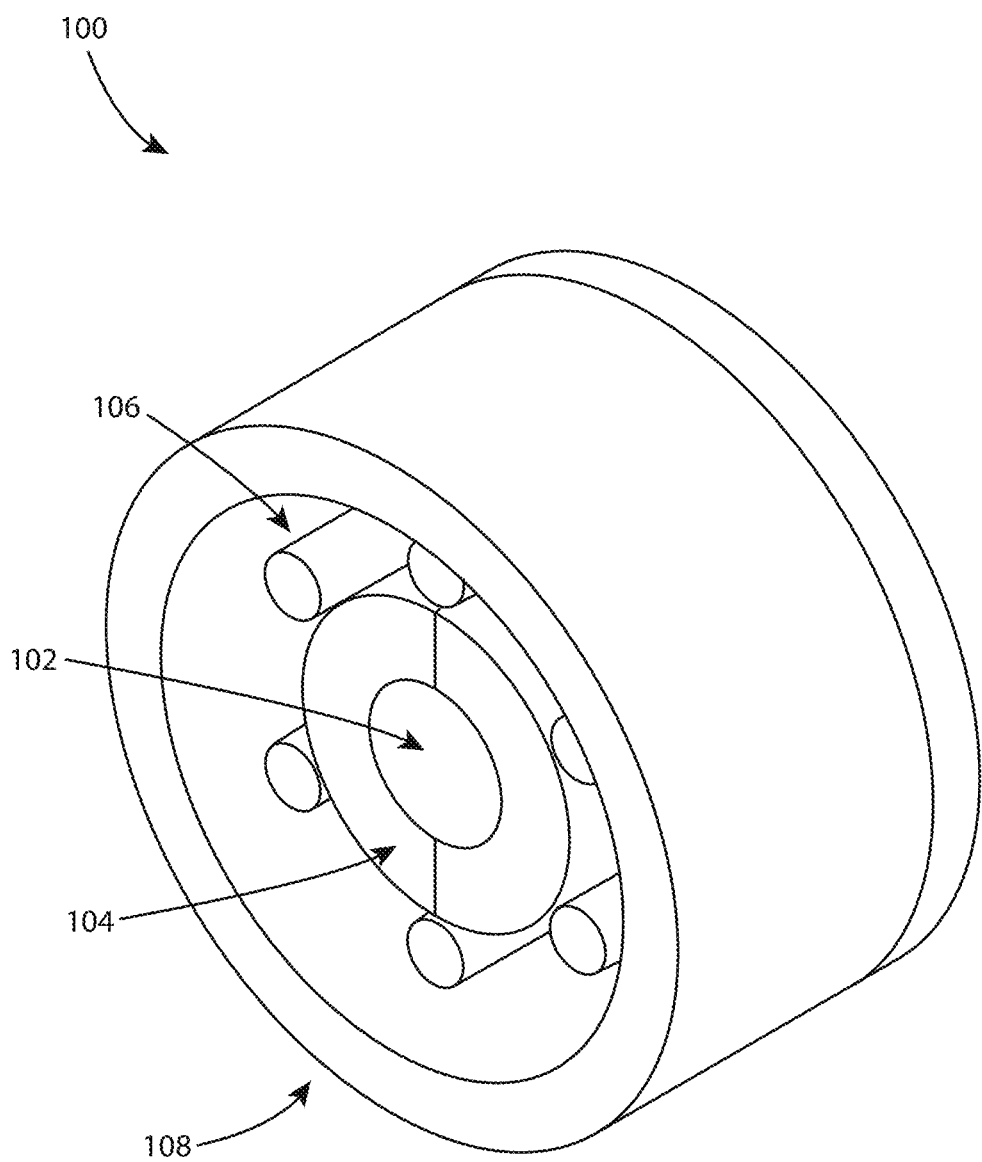
FIG. 1 is a diagram illustrating a prospective view of an electro-permanent magnet (EPM), according to an embodiment of the present invention.

FIG. 1 is a diagram illustrating a prospective view of EPM 100, according to an embodiment of the present invention. In an embodiment, EPM 100 includes a low coercivity magnet 102 surrounded by a reversible coil 104. Reversible coil 104 may be composed of copper, in some embodiments. One or more high coercivity magnets 106 surround low coercivity magnet 102 and reversible coil 104. Low coercivity magnet 102 may be composed of low coercivity material such as Alnico, and one or more high coercivity magnets 106 are composed of high coercivity material such as Neodymium.

Reversible coil 104 may switch polarity of low coercivity magnet 102 to effectively null the much stronger, one or more high coercivity magnets 106. The ability to null one or more high coercivity magnets 106 is the process by which the EMS, which uses one or more EPMs, connects and disconnects adjacent satellites, remote vehicle, or other payloads.

Low coercivity magnet 102, reversible coil 104, and one or more high coercivity magnets 106 are enclosed within an outer ferromagnetic material 108. Outer ferromagnetic material 108 may be composed of steel in some embodiments. Some embodiments utilize ferromagnetic material 108 because a magnetic flux return path created by the ferromagnetic material 108 captures most of the magnetic flux in the material and mitigates the amount of stray magnetic fields created by the device. A coating composed of molybdenum disulfide or other material may be applied to outer ferromagnetic material 108 to prevent cold welding. By preventing cold welding, the magnetic mooring system reliably connects and disconnects adjacent satellites, remote vehicle, or other payloads.

During operation, the release, when EMP 100 is switched off, removes the external poles of EPM 100. To switch EPM 100, reversible coil 104 creates a magnetic field in the opposite polarity of the current polarity of the low coercivity magnet in sufficient strength to switch the polarity of the low coercivity magnet. By switching EPM 100 off, the attached device (not shown) is free to move away from the carrier bus. This release is reusable in that it can reattach to another device and is not limited to a single release event. The release may be incorporated into a robot end effector greatly simplifying the task of gripping and releasing tools and or material for on-orbit assembly. The rate that the system changes state also allows the recovery of strain energy to happen over a longer time period, which greatly reduces the shock load to the attached device.

Further, in some additional embodiments, the EPM mooring system contains no moving parts and requires no power during static operation.

Figure 2:
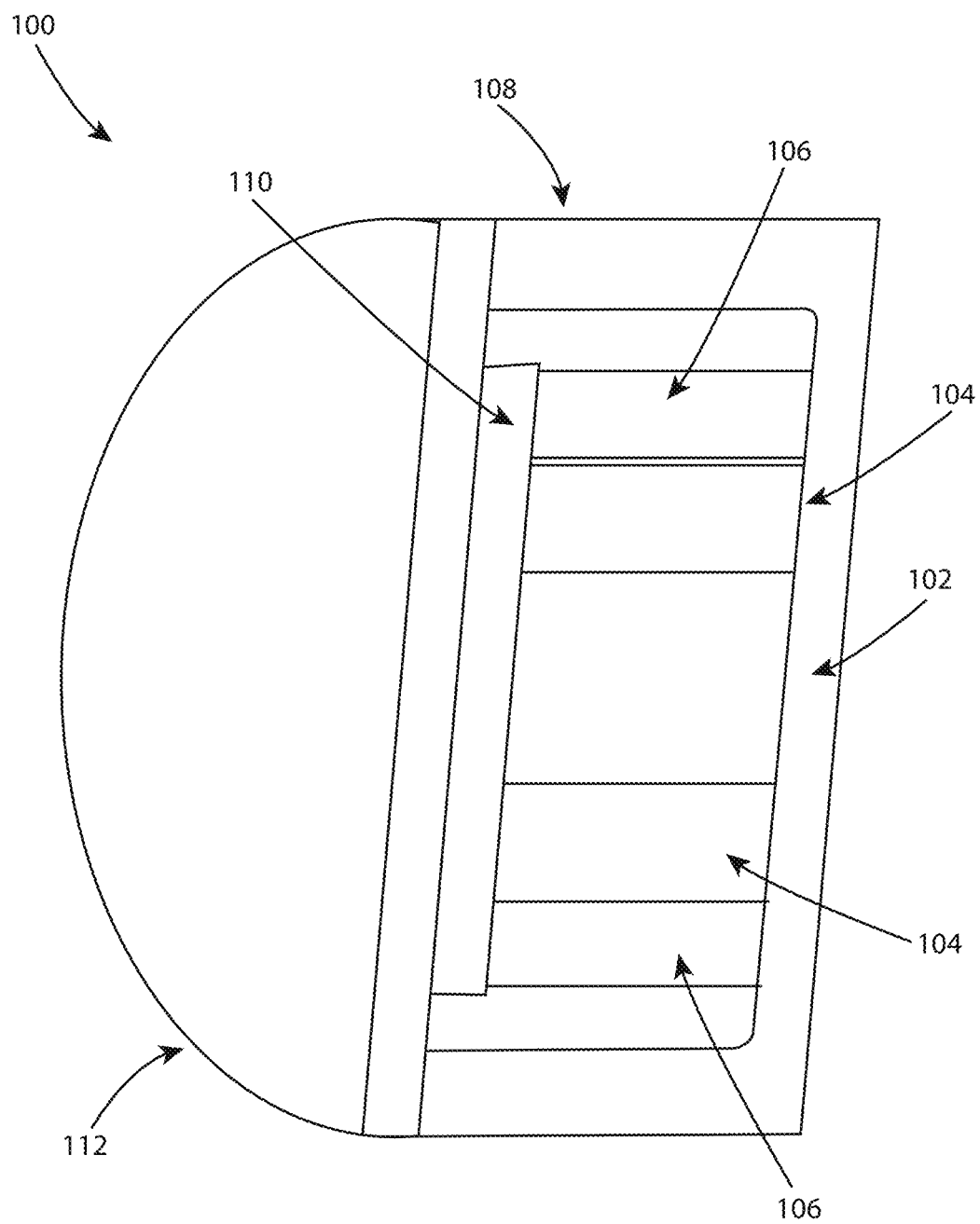
FIG. 2 is an image illustrating a cross-section of EPM, according to an embodiment of the present invention.

FIG. 2 is a diagram illustrating a cross-section of EPM 100, according to an embodiment of the present invention. In an embodiment, low coercivity magnet 102 and reversible coil 104 control the state of EPM 100. In some embodiments, low coercivity magnet 102 is a single (or an internal) cylindrical Alnico magnet and one or more high coercivity magnets 106 are a ring of cylindrical Neodymium magnets.

During the "ON" state, for example, the flux is routed from both low coercivity magnet 102 and one or more high coercivity magnets 106 into inner ferromagnetic material 110. Thereafter, the flux crosses to external ferromagnetic clamp 112, which generates the desired mooring forces. The desired mooring force is the attractive force generated by the magnetic flux as the magnetic force passes from the inner ferromagnetic material 110 to external ferromagnetic clamp 112. This force can be adjusted by changing various elements in the design such as the number of magnets, size of the magnets, the geometry of ferromagnetic material, and other factors. Finally, the flux returns to outer ferromagnetic material 108 and ultimately to the opposite pole of low coercivity magnet 102 and one or more high coercivity magnets 106 to complete the magnetic circuit.

In the example of the "OFF" state, the pole of low coercivity magnet 102 is reversed to route the flux into inner ferromagnetic material 110. In this example, the flux is routed by way of one or more high coercivity magnets 106. Thereafter, the flux is routed through low coercivity magnet 102 into a portion of outer ferromagnetic material 108, the portion being near low coercivity magnet 102 and one or more high coercivity magnets 106. The flux is then routed back into one or more high coercivity magnets 106 to complete the magnetic circuit.

FIG. 3 is a diagram illustrating the "ON" and "OFF" magnetic flux path of EPM 100, according to an embodiment of the present invention. Depending on the embodiments, EPM may be formed from low coercivity magnet 102 and one or more high coercivity magnets 106 forming a ring of magnets.

In FIG. 3, the magnetic flux paths for the "ON" (see image (a)) and "OFF" states (see image (b)) of EPM 100. As shown in image (a), during the "ON" state, the flux travels out of the north poles of low coercivity magnet 102, through adjacent ferromagnetic clamping plate 112, and then down outer ferromagnetic material 108. Thereafter, the flux travels to the south poles of one or more high coercivity magnets 106 and low coercivity magnet 102 to complete the magnetic circuit.

As shown in image (b), during the off state, the magnetic pole of one of low coercivity magnet 102 or one or more high coercivity magnets 106 is reversed. This reversal causes the flux to be routed through the ferromagnetic material 110 and a portion of 108 releasing the mooring force on the external ferromagnetic plate 112. Since no magnetic flux is routed through 112 to 108 the clamping force is nulled and 112 is released.

In an embodiment, an EPM for an EMS includes a low coercivity magnet surrounded by a reversible coil, and one or more high coercivity magnets surrounding the low coercivity magnet and the reversible coil. The reversible coil may switch polarity of the low coercivity magnet to null the stronger, one or more high coercivity magnets, and the nulling of the stronger, one or more high coercivity magnets allows for the EMS to connect and disconnect to an adjacent apparatus.

In some embodiments, the reversible coil is composed of copper, the low coercivity magnet is composed of Alnico, and the one or more high coercivity magnet is composed of Neodymium.

In certain embodiments, the EPM includes an outer ferromagnetic material that encloses the low coercivity magnet, the reversible coil and the one or more high coercivity magnets, to mitigate stray magnetic fields created by the EPM. The outer ferromagnetic material includes a coating to prevent cold welding, ensuring connecting and disconnecting of the EPM to the adjacent apparatus.

In an embodiment, when the EPM is switched on, the reversible coil creates a magnetic field in opposite polarity of a current polarity of the low coercivity magnet with strength to switch polarity of the low coercivity magnet. Also, when the EPM is in an ON state, flux is routed from the low coercivity magnet and the one or more high coercivity magnets into an inner ferromagnetic material. The flux then crosses to an external ferromagnetic clamp, the external ferromagnetic clamp generating desired mooring forces. The desired mooring force is an attractive force generated by the flux as magnetic force passes from the inner ferromagnetic material to the external ferromagnetic clamp. Furthermore, when the EPM is in the ON state, the flux returns to an outer ferromagnetic material and to the opposite pole of the low coercivity magnet and the one or more high coercivity magnets to complete the magnetic circuit.

In another embodiment, when the EPM is in an OFF state, a pole of the low coercivity magnet is reversed to route flux into the inner ferromagnetic material, the flux being routed by way of the one or more high coercivity magnets. The flux is then routed through the low coercivity magnet into a portion of an outer ferromagnetic material, the portion being near the low coercivity magnet and the one or more high coercivity magnets. The flux is finally routed back into the one or more high coercivity magnets to complete a magnetic circuit.

In an alternative, an apparatus for an EMS includes a reversible coil surrounding a low coercivity magnet, configured to switch polarity of the low coercivity magnet to null a stronger, one or more high coercivity magnets. The switching of the polarity allows for the EMS to connect and disconnect with an adjacent vehicle.

The apparatus also includes an outer ferromagnetic material enclosing the low coercivity magnet, the reversible coil, and the one or more high coercivity magnets, configured to create a magnetic flux return path capturing magnetic flux in the outer ferromagnetic material and mitigate stray magnetic fields created by the apparatus.

The apparatus also includes a coating composed of molybdenum disulfide applied to outer magnetic ferromagnetic material prevents cold welding. The low coercivity magnet and the reversible coil controls state of the apparatus, wherein the state comprises an ON state and an OFF state. The low coercivity magnet comprise of a single or an internal cylindrical Alnico magnet, and the one or more high coercivity magnets comprise of a ring of cylindrical Neodymium magnets.

In some embodiments, during the ON state, magnetic flux is routed from the low coercivity magnet and the one or more high coercivity magnets into inner ferromagnetic material. The magnetic flux further crosses to an external ferromagnetic clamp generating mooring forces, and the magnetic flux returns to an outer ferromagnetic material and to opposite pole of the low coercivity magnet and the one or more high coercivity magnets to complete a magnetic circuit.

In another embodiment, during the OFF state, the flux is routed by the one or more high coercivity magnets and through the low coercivity magnet into a portion of an outer ferromagnetic material, the portion being located near the low coercivity magnet and the one or more high coercivity magnets. The flux is routed back into the one or more high coercivity magnets to complete a magnetic circuit.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An electro-permanent magnet (EPM) for an electromagnetic mooring system (EMS), comprising:
   a low coercivity magnet surrounded by a reversible coil; and
   one or more high coercivity magnets surrounding the low coercivity magnet and the reversible coil in a circular or ring pattern, wherein
   the reversible coil is configured to switch polarity of the low coercivity magnet to null the one or more high coercivity magnets,
   the nulling of the one or more high coercivity magnets allows for the EMS to connect and disconnect to an adjacent apparatus, and
   the low coercivity magnet comprise of a single or an internal cylindrical Alnico magnet, and the one or more high coercivity magnets comprise of a ring of cylindrical Neodymium magnets.

2. The EPM of claim 1, wherein the reversible coil is composed of copper.

3. The EPM of claim 1, further comprising:
   an outer ferromagnetic material encloses the low coercivity magnet, the reversible coil and the one or more high coercivity magnets, to mitigate stray magnetic fields created by the EPM.

4. The EPM of claim 3, wherein the outer ferromagnetic material comprises a coating to prevent cold welding, ensuring connecting and disconnecting of the EPM to the adjacent apparatus.

5. The EPM of claim 1, wherein, when the EPM is switched on, the reversible coil creates a magnetic field in opposite polarity of a current polarity of the low coercivity magnet with strength to switch polarity of the low coercivity magnet.

6. The EPM of claim 1, wherein, when the EPM is in an ON state, flux is routed from the low coercivity magnet and the one or more high coercivity magnets into an inner ferromagnetic material.

7. The EPM of claim 6, wherein, when the EPM is in the ON state, the flux crosses to an external ferromagnetic clamp, the external ferromagnetic clamp generating desired mooring forces, the desired mooring force is an attractive force generated by the flux as magnetic force passes from the inner ferromagnetic material to the external ferromagnetic clamp.

8. The EPM of claim 7, wherein, when the EPM is in the ON state, the flux returns to an outer ferromagnetic material and to the opposite pole of the low coercivity magnet and the one or more high coercivity magnets to complete the magnetic circuit.

9. The EPM of claim 1, wherein, when the EPM is in an OFF state, a pole of the low coercivity magnet is reversed to route flux into an inner ferromagnetic material, the flux being routed by way of the one or more high coercivity magnets.

10. The EPM of claim 9, wherein the flux is routed through the low coercivity magnet into a portion of an outer ferromagnetic material, the portion being near the low coercivity magnet and the one or more high coercivity magnets.

11. The EPM of claim 10, wherein, the flux is routed back into the one or more high coercivity magnets to complete a magnetic circuit.

12. An apparatus for an electromagnetic mooring system (EMS), comprising:
 a reversible coil surrounding a low coercivity magnet, configured to switch polarity of the low coercivity magnet to null one or more high coercivity magnets, wherein
 the switching of the polarity allows for the EMS to connect and disconnect with an adjacent vehicle, and
 the low coercivity magnet comprise of a single or an internal cylindrical Alnico magnet, and the one or more high coercivity magnets comprise of a ring of cylindrical Neodymium magnets.

13. The apparatus of claim 12, further comprising:
 an outer ferromagnetic material enclosing the low coercivity magnet, the reversible coil, and the one or more high coercivity magnets, configured to create a magnetic flux return path capturing magnetic flux in the outer ferromagnetic material and mitigate stray magnetic fields created by the apparatus.

14. The apparatus of claim 12, further comprising:
 a coating composed of molybdenum disulfide applied to outer magnetic ferromagnetic material prevents cold welding.

15. The apparatus of claim 12, wherein the low coercivity magnet and the reversible coil controls state of the apparatus, wherein the state comprises an ON state and an OFF state.

16. The apparatus of claim 15, wherein, during the ON state,
 magnetic flux is routed from the low coercivity magnet and the one or more high coercivity magnets into inner ferromagnetic material,
 the magnetic flux further crosses to an external ferromagnetic clamp generating mooring forces, and
 the magnetic flux returns to an outer ferromagnetic material and to opposite pole of the low coercivity magnet and the one or more high coercivity magnets to complete a magnetic circuit.

17. The apparatus of claim 15, wherein, during the OFF state,
 the flux is routed by the one or more high coercivity magnets and through the low coercivity magnet into a portion of an outer ferromagnetic material, the portion being located near the low coercivity magnet and the one or more high coercivity magnets, and
 flux being routed back into the one or more high coercivity magnets to complete a magnetic circuit.

* * * * *